United States Patent [19]
Jones

[11] 3,742,436
[45] June 26, 1973

[54] SIDE LOOKING SONAR APPARATUS
[75] Inventor: Charles H. Jones, Murrysville, Pa.
[73] Assignee: Westinghouse Electric Corporation, Pittsburgh, Pa.
[22] Filed: Mar. 24, 1971
[21] Appl. No.: 127,654

[52] U.S. Cl. ............... 340/3 R, 340/9, 343/5 PC, 346/33 EC
[51] Int. Cl. ............................................. G01s 9/66
[58] Field of Search ............... 340/3 R, 8 R, 85, 340/9, 10; 343/5 CM, 5 PC

[56] References Cited
UNITED STATES PATENTS
| | | | |
|---|---|---|---|
| 3,144,631 | 8/1964 | Lustig et al. | 340/3 R |
| 3,296,579 | 1/1967 | Farr et al. | 340/3 R |
| 3,585,578 | 6/1971 | Fischer, Jr. | 340/3 R |
| 3,359,537 | 12/1967 | Geil et al. | 340/9 X |
| 3,381,264 | 4/1968 | Lavergne et al. | 340/3 R |
| 3,585,579 | 6/1971 | Dorr et al. | 340/9 |
| 3,553,638 | 1/1971 | Sublett | 340/3 R |

Primary Examiner—Richard A. Farley
Attorney—F. H. Henson, E. P. Klipfel and D. Schron

[57] ABSTRACT

A side looking sonar transmitter projects acoustic energy to sonify a certain area on the sea bottom. A receiver apparatus forms a plurality of receiver beams for receiving reflected projected acoustic energy from a plurality of adjacent receiver strips. A display apparatus is provided for portraying signals associated with these strips. The area portrayed is made equal to or less than the area sonified and the apparatus is utilized in a linear mode or a rotating mode.

12 Claims, 18 Drawing Figures

SIDE LOOKING SONAR APPARATUS

BACKGROUND OF THE INVENTION

1. Field of the Invention

Side looking sonar systems.

2. Description of the Prior Art

Generally, in side looking sonar systems also known by other names such as oblique looking, obtuse looking or shadow systems, a transducer transmitter on a carrier vehicle periodically projects pulses of acoustic energy athwartship of carrier travel, toward a target area such as the sea bottom. The transmitter energy has a beam pattern which is of extremely narrow width, for example less than 1°, in the direction of carrier travel so that the projected acoustic energy impinges upon the sea bottom in a relatively narrow elongated area. This area upon which the acoustic energy impinges is known as the sonified area.

Acoustic energy reflected back from the sonified area, and targets on it, is received by a transducer receiver. The receiver beam associated with the receiver is similar to the transmitted beam such that the receiver detects reflected acoustic energy from a relatively narrow strip on the sea bottom, also athwartship of the carrier travel, and referred to herein as a receiver or receiving strip.

The received acoustic energy is processed and the associated signal is displayed on a suitable display apparatus such as electrosensitive moving recording paper or cathode ray storage tube. With each pulse transmission and subsequent reception, a scan line is produced on the display apparatus to build up a picture of the sea bottom in a manner similar to the scanning of a conventional cathode ray beam in a television picture tube.

For ocean bottom surveys, or searches, with such apparatus to be practical, two conditions must be satisfied: first, the system resolution must be good enough to ensure detection of the target or objects of interest; and second, mapping rate should be as high as possible to minimize operating costs.

Resolution in the fore and aft direction, is limited by the width of the receiver strip. One type of side looking sonar system employs a curved, or focused arc transducer with a receiver strip having a width less than the length of the transducer. The carrier advance in the pulse to pulse interval should be approximately the width of the receiver strip so that the map strips will be adjacent, and not overlap or skip bottom areas between lines. By increasing the area detected and portrayed for each transmitted pulse, the carrier speed and therefore the mapping rate could be significantly increased. The present invention accomplishes this while still maintaining the high resolution required, by forming multiple receiving beams.

Multiple receiving beams defining multiple receiving strips have been described, for example in U.S. Pat. No. 3,296,579. In that patent, a single transmitting beam is oriented transverse to a plurality of adjacent receiver strips. The receiver strips which extend in the direction of travel are perpendicular to the sonified area and compensate for pitch of the carrier vessel. The arrangement is used for contour mapping and the multiple receiver strips do not allow for increased vessel speeds since the only information received is that from the area where the sonified strip crosses the receiver strips.

Multiple receiver strips have been suggested for side looking sonar apparatus in application Ser. No. 818,006 filed Apr. 21, 1969, now U.S. Pat. No. 3,585,578 and assigned to the same assignee as the present invention. The multiple receiver strips in that application however were associated with multiple receivers and multiple transmitters operating at different frequencies. The present invention eliminates the need for multi-frequency apparatus.

In U.S. Pat. No. 3,381,264 a transmitter transducer is oriented perpendicular to a receiving transducer which forms a plurality of receive beams. The beams however are displaced from one another in a vertical direction to coincide with a set of vertically spaced parallel planes so that a contour line map may be provided.

SUMMARY OF THE INVENTION

Side looking sonar apparatus adapted to travel linearly or be rotated over a target area includes a transmitter transducer and receiver apparatus having a receiver transducer of a length greater than the transmitter transducer length. Acoustic energy is projected by the transmitter to sonify a portion of the target area and the receiver apparatus forms multiple receiver beams for receipt of acoustic energy reflected from multiple adjacent and touching elongated receiver strips on the target area. The total area of the portion sonified is equal to or greater than the total area of all the receiver strips. In one form, a single receiver arc transducer is made up of a plurality of transducer elements arranged in end to end relationship along a line, the line being curved for high resolution applications, and the elements are so phased that the resulting receiver strips on the bottom are slightly curved, are touching, and are adjacent. The apparatus is operable to portray return signals from these receiver strips.

DESCRIPTION OF THE PREFERRED EMBODIMENT

Figure 1:
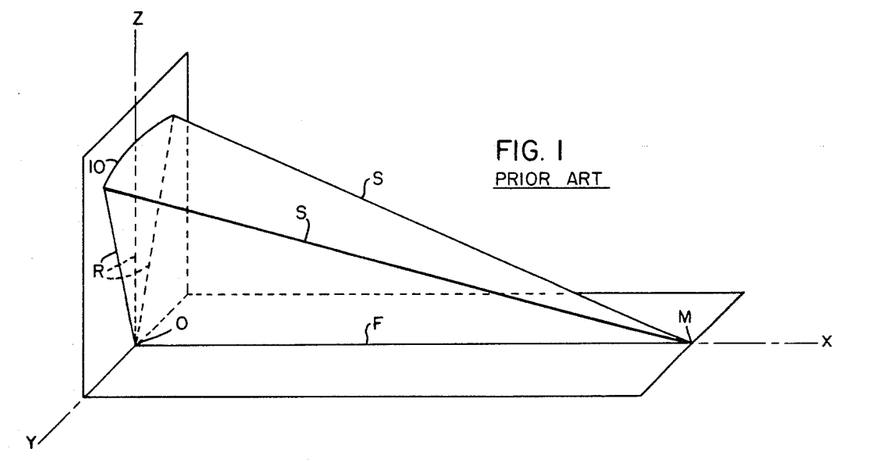
FIG. 1 is an X, Y and Z coordinate system illustrating the principles of the focused side looking sonar transducer of the prior art.

In FIG. 1, the curved, or focused transducer 10 lies in the Y-Z plane at an altitude or distance R from the origin O. The curved transducer 10 lies on a section of a circle having as its center the point O with a radius equal to R and accordingly, each point of the transducer 10 is at the same distance R from O. Line F, known as the line of focus is perpendicular to the plane of the circle at point O and any point on line F is equidistant to all points on the transducer 10.

Point O and line F lie in the X-Y plane which is the target area, for example the sea bottom. Two lines S are illustrated and are drawn from a point M on the line of focus F to the ends of the transducer. If point M is at a maximum range and transducer 10 is a transmitter, then projected acoustic energy will impinge on the X-Y plane along the line of focus F and with the beam pattern associated with the transducer 10, maximum acoustic energy may be said to be contained within the volume defined by the two lines S and the line of focus F.

Figure 2:
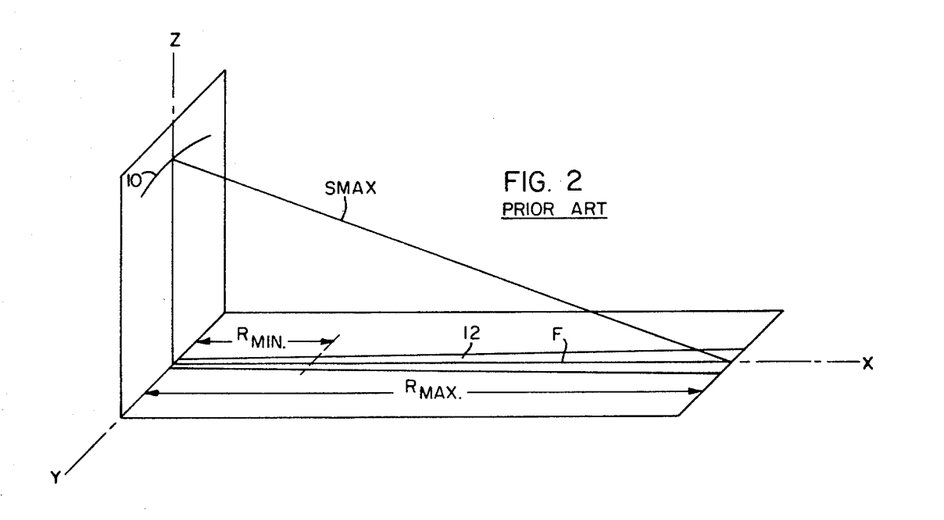
FIG. 2 is similar to FIG. 1 and illustrates the actual area of interest for the curved transducer.

If the transducer 10 is a receiver transducer then it will receive reflected acoustic energy from an area along the line of focus F. In actual practice, the projected acoustic energy sonifies a wedge shaped area 12, as illustrated in FIG. 2. For the receive situation, the area 12 represents a receiver strip, that is, the area from which reflected acoustic energy will be received and detected.

The maximum slant range, designated $S_{MAX}$, is determined by various factors, some of which are the transmitter power and frequency, attenuation of the medium and the pulse repetition rate of the transmitted acoustic energy. Target returns from an area directly below the transducer 10 all arrive at the transducer substantially simultaneously and accordingly the resolution in this area is generally poor. Therefore, the apparatus is designed so that return signals will be displayed from a minimum range designated $R_{MIN}$ out to a maximum range designated $R_{MAX}$.

In operation, a sonified area such as 12 is projected at a slight angle relative to the X axis so that as the apparatus moves in the direction of the arrow (in the Y axis direction) the receiver strip will cover the sonified area to detect reflected acoustic energy. A subsequent pulse will provide a subsequent sonified area adjacent the previous sonified area and for high resolution work, the average width of the sonified (and receive) area is measurable in terms of a fraction of transducer length. Accordingly, the apparatus must move very slowly over the target area to receive enough information to display an accurate picture.

The width of the sonified area or receiver strip is dependent upon the length of the transducer. Basically, for a given operating wavelength $\lambda$ the greater the length of transducer 10, the smaller will be the width of area 12, and typical transducers are many wavelengths long, for example hundreds or even over a thousand $\lambda$.

Figure 3:
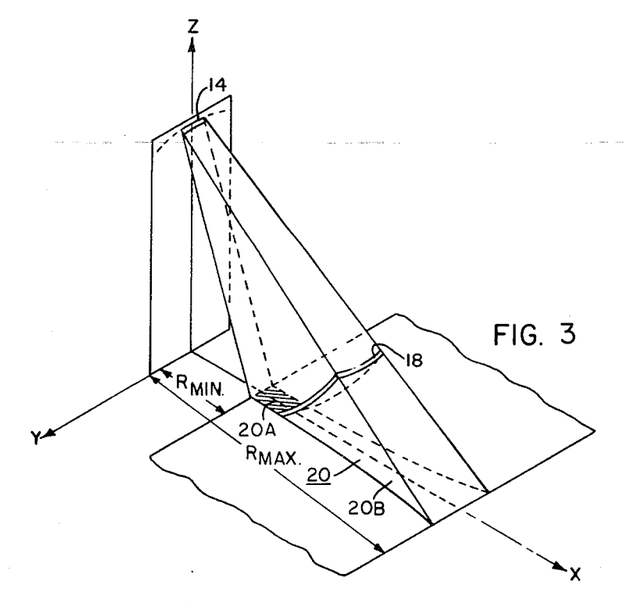
FIG. 3 is an Z, Y, Z coordinate system illustrating the projection of a pulse of acoustic energy by the transmitter of the present invention.

In the present invention, and with reference to FIG. 3, there is provided a transmitting transducer such as transducer 14, having a length which is much smaller than the associated receiver transducer shown in dotted lines. A pulse of acoustic energy 18 is transmitted by the transducer 14 and sonifies a trapezoidal area 20 at least from range $R_{MIN}$ to $R_{MAX}$. In the illustration of FIG. 3 the pulse 18 has already sonified a portion 20A shown shaded and, as the pulse 18 proceeds outwardly, will sonify the remainder 20B of the area 20. Since the length of the transducer 14 is much smaller than is normally employed, the average width of the sonified area 20 will be much wider than heretofore since its width is inversely proportional to the length of the transducer.

Figure 4:
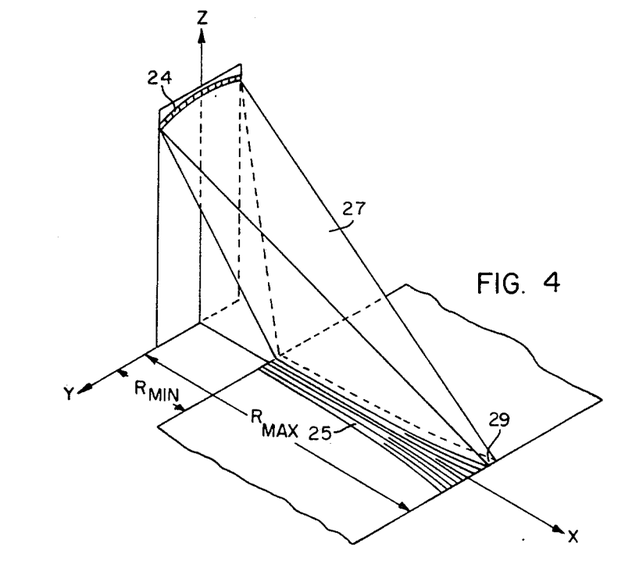
FIG. 4 illustrates one type of receiver transducer of the present invention and the multiple receiver strips on the target area.

Even though the sonified area is much wider than is normally encountered in such side looking sonar system, high system resolution is still maintained. This is accomplished, as illustrated in FIG. 4, by the provision of a receiver transducer 24 which, with associated receiver apparatus, forms a plurality of receive beams whereby information is received from a plurality of receiver strips 25 formed on the target area. A portion of one of the receiving beams 27 is illustrated and defines the receiver strip 29, having a slight hyperbolic curvature, as do other strips in the plurality 25.

FIG. 3 illustrates the sonified area 20 as being symmetrically disposed on either sides of the X axis. In actual practice, since the energy from the minimum range $R_{MIN}$ arrives at the receiver sooner than the energy from the maximum range, the transducer 14 is oriented so that the sonified area is at a slight angle, for example less than 1°, with respect to the X axis. FIG. 4 represents the apparatus at a point in time after an acoustic transmission has taken place and acoustic reflections are ready to be received. The total area of the sonified portion 20 is made at least equal to, and preferably greater than the total area of the plurality of receiving strips 25 so that with just one acoustic transmission, and with N receiving strips, the carrier on which the transmitter transducer 14 and receiver transducer 24 are mounted, can travel at a speed N times as fast while still maintaining high system resolution or cover the same area as heretofore in 1/Nth the time.

Figure 5:
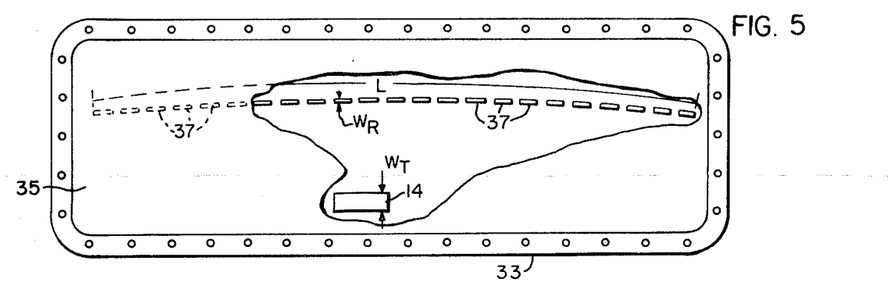
FiG. 5 is one type of transducer arrangement which may be utilized herein.

FIG. 5 illustrates one type of transducer arrangement for accomplishing the sonification illustrated in FIG. 3 and the reception illustrated in FIG. 4. The transducer apparatus is contained within a housing 33 having a covering 35, a portion of which is broken away to show the transducers 14 and 24 therein. The covering member 35 is made of a material having the same acoustic transmission properties as the medium in which it operates, sea water being the present example, and one such material in general use is a material known as rho-c rubber.

The receiver transducer 24 is made up of a plurality of transducer elements 37 arranged in end to end relationship along a line which is the arc of a circle having the radius R where R is the design altitude of operation. For certain designs the elements may be of magnetostrictive construction. For other designs and as illustrated herein the elements 37 may be of a conventional transducer material such as barium titanate or lead zirconate titanate.

The length of the receiver transducer 24 is designated L and L is made approximately equal to $$(S_{MAX} \lambda/B) K_s$$

where:

$S_{MAX}$ is the maximum slant range,

B is the resolution desired at the maximum slant range, $\lambda$ is the wave length of the operating frequency, in the medium in which the apparatus is operating, and $K_s$ is a shading factor.

Shading is well known to those skilled in the art. For example in one form of shading certain elements are provided with power of a magnitude different than that supplied to other elements. If all of the elements are supplied with equal power the value of $K_s$ above is 0.89. In order to reduce objectionable side lobes, shading may be employed, and a typical range for the shading factor $K_s$ is generally from 0.89 up to 1.2.

The length of the transmitting transducer, assuming no shading should be approximately $L/N$, where L is the length of the receiving transducer and N is the number of beams, or receiver strips, employed. The transducer length may be made shorter than $L/N$ so that the sonified portion has an area greater than the area of the receiver strips so as to avoid the registration problems and to allow for a variation of vehicle velocities. In a well known manner a transmitter (not shown) supplies the transmitting transducer with energy so that propagation of acoustic energy of a certain frequency may be accomplished.

As is conventional, the elements 37 have a certain depression angle associated therewith and a similar depression angle should be used for the transmitter transducer 14. Each element 37 has a width designated $W_R$ and a similar width for the transmitter transducer would provide a satisfactory beam. However, in order to increase the power handling capability of the transmitter a wider face $W_T$ is preferred. If desired, to optimize the transmitter beam, the use of a shaped diverging acoustic lens may be employed in front of the transmitting transducer 14 or its face may be of a convex construction.

Figure 6:
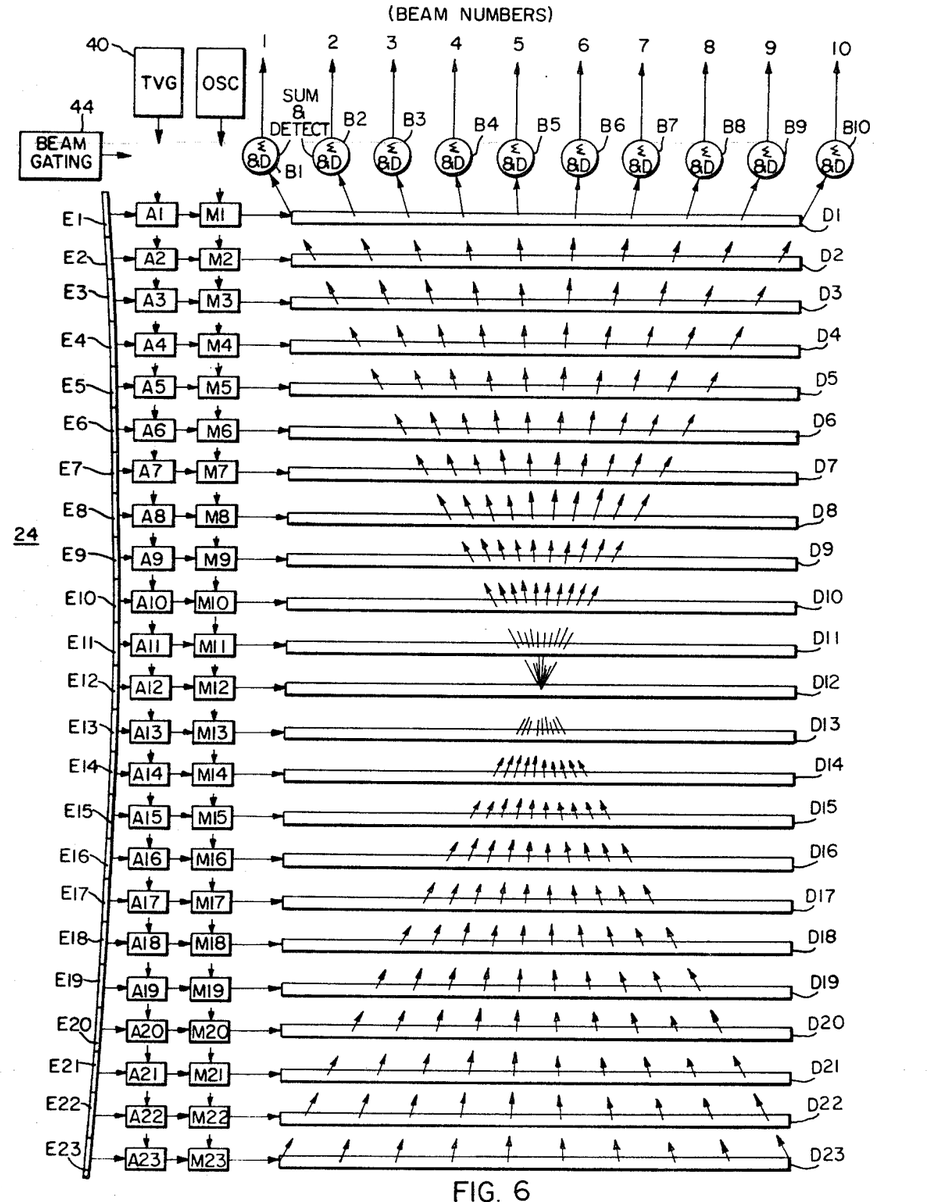
FIG. 6 is a block diagram illustrating one receiver apparatus for forming multiple receiver beams.

In order to form the plurality of receiver beams for receiving reflected acoustic energy from the plurality of adjacent receiver strips on the target area the signal provided by each individual transducer element 37 is phased, or delayed relative to the other elements. One means by which this may be accomplished is illustrated in FIG. 6 where for purposes of illustration, the apparatus will be described with respect to forming 10 receiving beams with a receiver transducer comprised of 23 individual transducer elements designated E1 to E23.

It will be apparent that the apparatus can be expanded to form, for example, hundreds of receiving beams and that such transducer apparatus could be provided on either side of a carrier rather than just on a single side as is described by way of example herein.

As is well known to those skilled in the art, each individual element includes on the front and rear surfaces thereof electrode means and upon the receipt of reflected acoustic energy will provide a corresponding output signal. Accordingly there is provided a plurality of amplifiers A1 to A23 each being responsive to a respective signal provided by the transducer elements and each having a gain varied with time by the time varying gain circuit 40 so that the typical no target bottom reverberation pattern will appear on the display as a substantially constant background signal (since the intensity of signal returns diminishes with distance).

The signal from each element is fed to a respective delay line designated D1 to D23 for signal processing. Such delay lines may be of the acoustic variety or may be electromagnetic, magnetic tape, to name a few. In order to make the received signal compatible with the particular delay line, there is provided a local oscillator 42 which provides its output signal to a plurality of mixers M1 to M23 to change the frequency of the incoming signals, if required.

In the present example, 10 receiving beams are formed for displaying reflected acoustic energy from a corresponding plurality of adjacent receiver strips and accordingly each delay line is provided with ten taps. The taps are located at different distances along the delay line and 10 summing and detection circuits B1 to are provided, each for receiving 23 input signals from the delay lines as indicated by the small arrows from the delay lines pointing to the sum and detector circuit to which it is connected. The output signals of the sum and detector circuits B1 to B10 are the signals from the adjacent receiver strips and contain target information which may be stored and/or displayed. If just a certain portion of the bottom is to be examined, for example, from $R_{MIN}$ to $R_{MAX}$, in FIG. 4, there may be provided a beam gating circuit 44 operable to gate the B1 to B10 outputs at the desired time.

By way of further example, it will be assumed that the apparatus described is operating at a frequency of 3 megahertz, and accordingly a wavelength of 0.02 inches with the shading factor $K_s$ being 1.12, the arc length L being 13.6 inches and R, the radius of curvature or altitude being 50 feet, with a slant range from the transducer to a maximum range along the X axis being 100 feet. With these operating parameters and the circuitry of FIG. 6, there is formed 10 receiver strips 45 to 54 illustrated in FIG. 7A which is a view looking down on the target area. The center of the receiver apparatus is at point 58 (which is 50 feet above the Y axis) and the area examined extends for a width W from $R_{MIN}$ to $R_{MAX}$. Each receiver strip is 2 inches wide at its respective maximum range and each receiver strip generally follows a hyperbolic curvature. It is to be noted that the curvature appears somewhat exaggerated due to the difference in scale, the bottom range being in feet and beam location being in inches. If the apparatus were operated to form an odd number of beams, the middle beam which would lie along the X axis would be a special form of hyperbola, that is a straight line. The receiver strips 45 to 54 may be characterized as extending generally radially from a reference position at point 60 from which radial lines are drawn through several of the strips to illustrate this orientation.

Figure 7A:
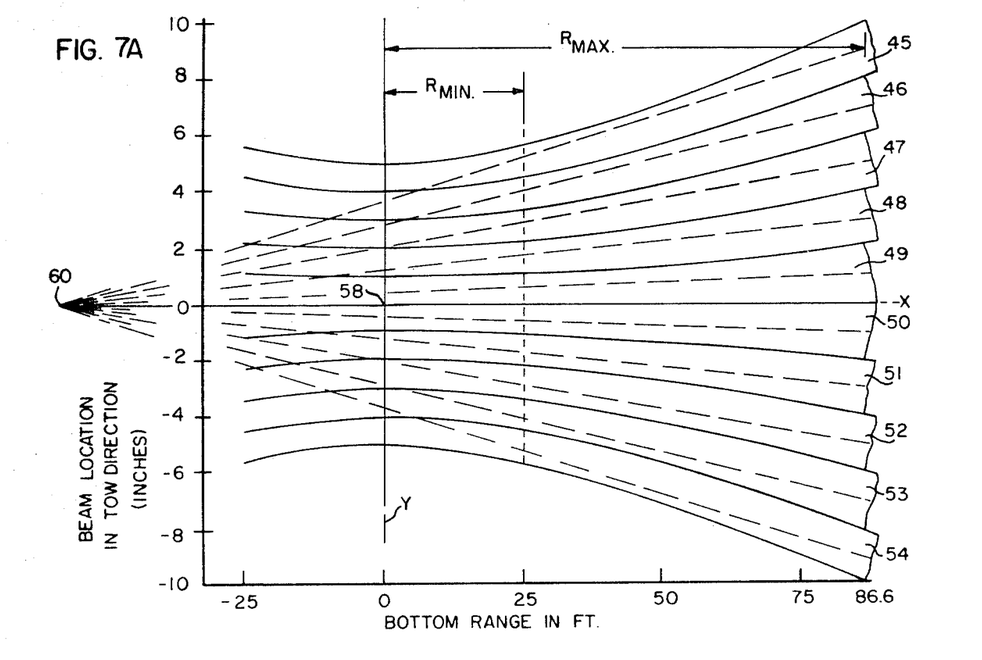
FIG. 7A is a plan view of the target area with the receiver strips formed by the apparatus of FIG. 6.
Figure 7B:
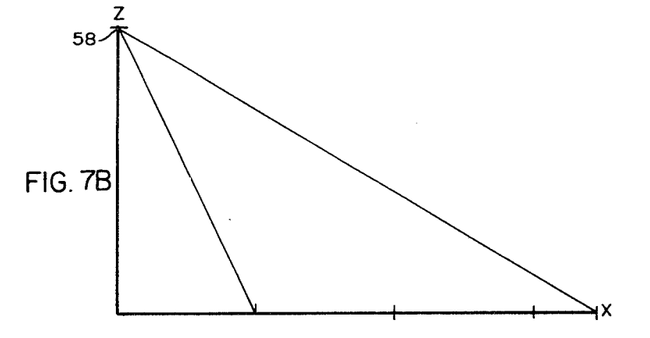
FIG. 7B illustrates the transducer position for the receiver strips of FIG. 7A.

FIG. 7B illustrates an elevational view drawn to the same scale as FIG. 7A. The apparatus is located at point 58 (proceeding toward the viewer) at an altitude of 50 feet. The slant range out to a maximum point on the X axis is 100 feet and the bottom range from directly below point 58 out to that maximum point is 86.6 feet. The slant range to the minimum point on the X axis is 56 feet and the bottom range is 25 feet.

Figure 8:
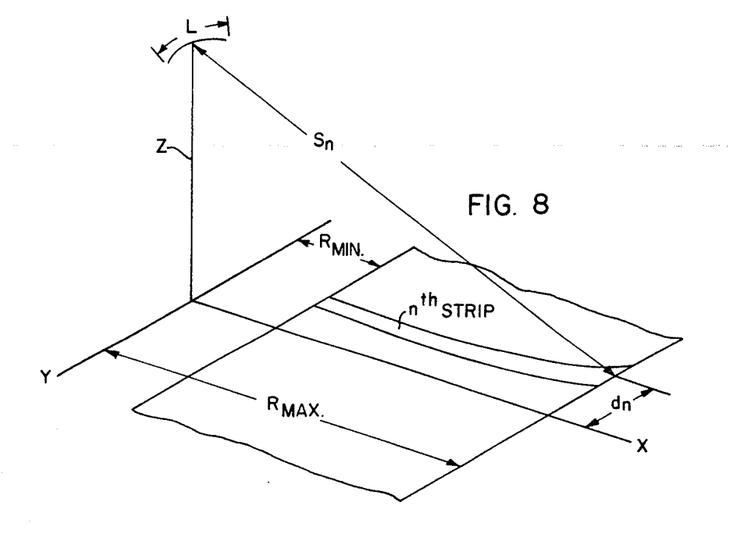
FIG. 8 illustrates a transducer in a coordinate system and illustrates various terms utilized.

In order to produce a set of receiver strips as illustrated in FIG. 7A, the elements E1 to E23 of FIG. 6 are relatively phased by means of the delay lines D1 to D23. In general, a particular delay will result in a particular receiving beam, and accordingly a receiver strip. FIG. 8 serves to illustrate the general rule for phasing. The receiver transducer represented by the arc has a length L. An Nth strip is illustrated on the target area with the middle of the strip at $R_{MAX}$ being located at a distance of $d_n$ from the X axis and a distance or slant range $s_n$ to the center of the receiver transducer.

The total phase difference $\theta$ from one end of the transducer to the other, in order to position a beam as shown in FIG. 8 is:

$$\theta = (L\ d_n/\lambda\ S_n)\ 360°$$

where:
$\theta$ is in degrees
$L$ is the length of the transducer
$\lambda$ is the wave length and
$d_n$ and $S_n$ are illustrated in FIG. 8.

With the parameters given, it may be shown that total delay necessary to form, for example, the receiver strip 45, which is 9 inches from the axis, in FIG. 7A is:
$\theta = (13.6''/0.02'')\ (9''/1,200'')\ 360° = 1,840°$
With 23 elements the phase shift required between any two elements is:
$\theta/M = 1,840/23 = 80°$
where: M equals the number of elements. The delay necessary to form the remaining receiver strips may be calculated with the above formulas. In order to avoid problems with certain undesirable side lobes it is preferable that:
$M \geq 2\ (N-1)$
where:
$M$ is the number of elements and
$N$ is the number of receiver strips.

Figures 9, 10:
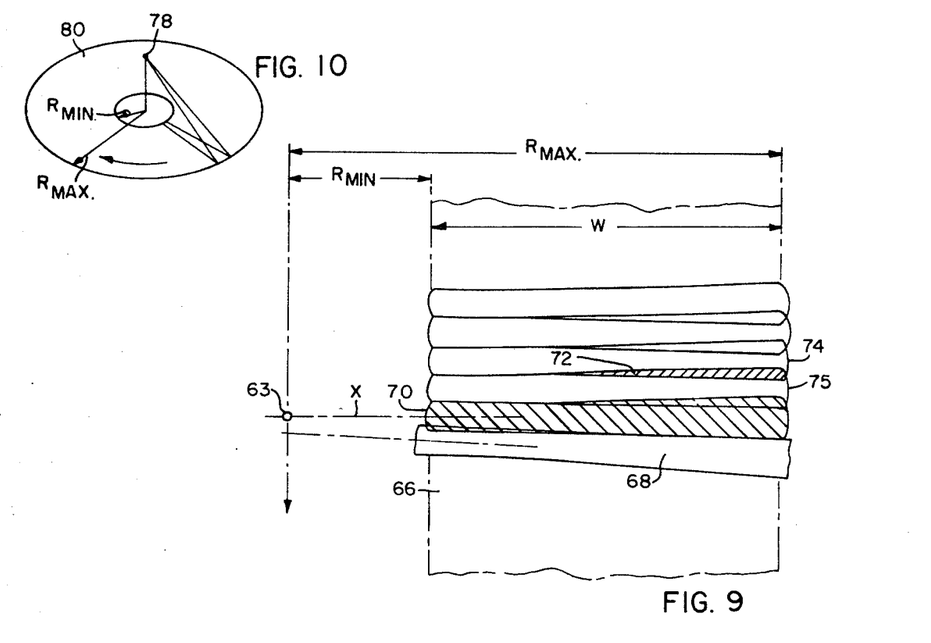
FIG. 9 is a plan view of a target area illustrating the relationship between the sonified area and the receiver strips.
FIG. 10 is a view of the apparatus as used in a rotational scan mode.

In one mode of operation, as illustrated in FIG. 9, the transducer apparatus at position 63 and traveling linearly in the direction of the arrow proceeds over a target area 66 to be searched. An acoustic transmission sonifies an area 68 which is at a slight angle with respect to the X axis. The plurality of receiver strips represented by the area 70 proceeds over the sonified area 68 to receive reflected energy therefrom and to record or display it.

Since the area of the plurality of receiver strips is not a perfect rectangle but diverges, there will be an overlap of information as indicated by the shaded portion 72 common to two previous positions 74 and 75 of the plurality of receiver strips. Depending upon the display apparatus utilized, that information contained in area 72 picked up by the receiver strips at 75 may be written or displayed over the exact same information picked up by the receiver strips at 74. Alternatively, to avoid any overlap the display may be suitably constructed so that half the information in area 72 may be displayed as a result of the receiver strip 74 and the other half as a result of the receiver strip 75.

In another mode of operation, as illustrated in FIG. 10, the apparatus at position 78 is rotated about a vertical axis to scan the circular area 80 on the sea bottom. In a manner similar to that in FIG. 9, the area display extends from a minimum position $R_{MIN}$ to a maximum position $R_{MAX}$. To accomplish this rotational mode of operation, the transducer apparatus may be constructed as illustrated in FIGS. 11 and 12.

Figure 11:
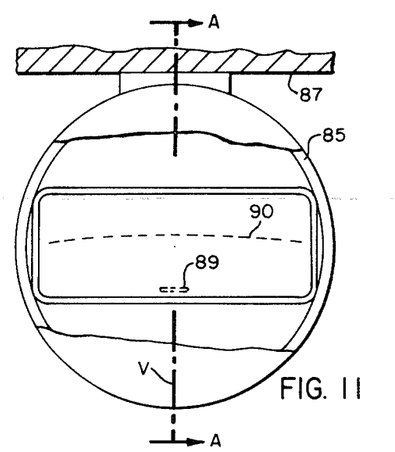
FIG. 11 is a front view of the apparatus as utilized in FIG. 10.

FiG. 11 illustrates the transducers carried in a spherical housing 85 connected to a carrier 87 and rotatable about axis V. A portion of the housing is broken away to illustrate the transmitting transducer 89 and the plurality of transducer elements forming the receiver transducer 90.

Figure 12:
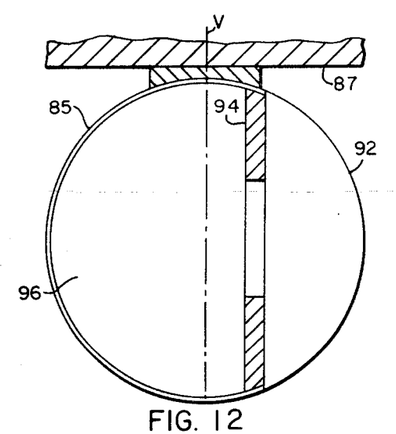
FIG. 12 is a cross-section view along the line AA of FIG. 11.

Cross sectional view of FIG. 11 along the line AA is illustrated in FIG. 12. The forward portion 92 of the spherical housing 85 is of an acoustic transmitting material such as the previously mentioned rho-c rubber and the space between it and the transducer assembly carried by internal wall 94, is filled with a suitable transducer liquid having the same acoustic properties as sea water. If desired, the rear portion 96 may be filled with various electronic equipment for transducer operation.

Figure 13:
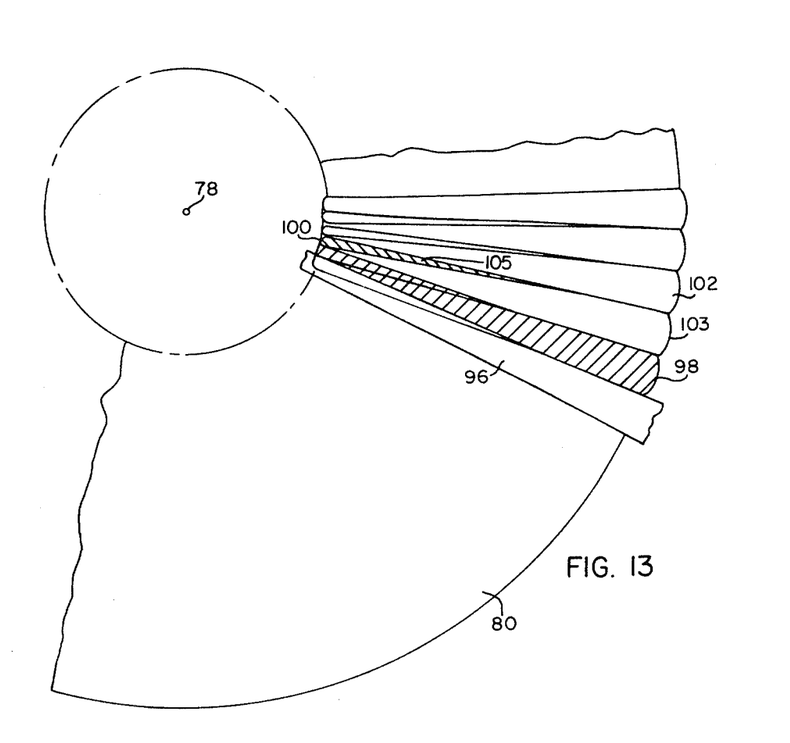
FIG. 13 is similar to FIG. 9 for the rotational search mode.
Figure 14:
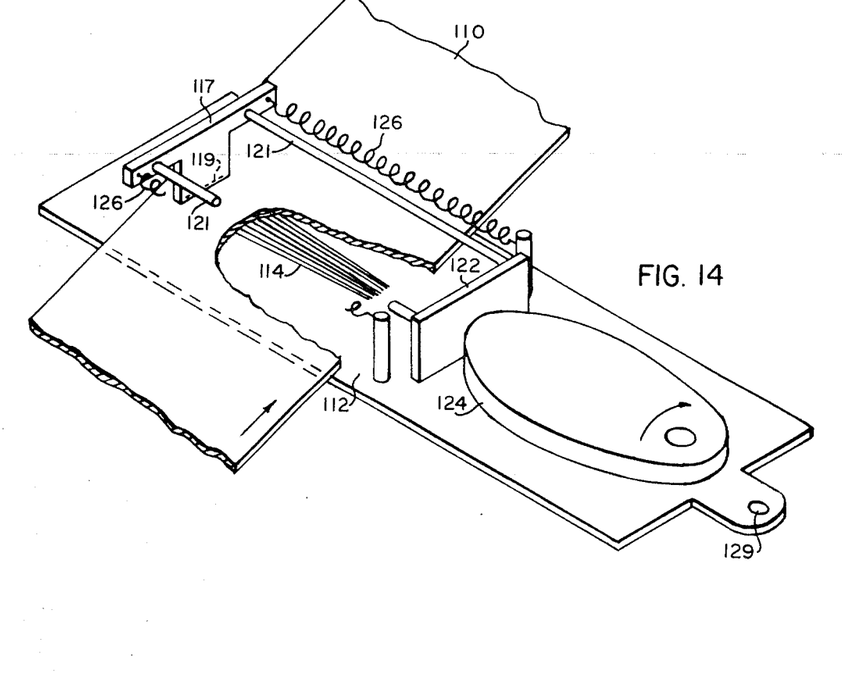
FIG. 14 illustrates a display apparatus, with a portion broken away, for the linear mode operation.

FIG. 13 is a plan view of the rotational mode of operation illustrated in FIG. 10. The rotating apparatus at position 78 periodically projects pulses of acoustic energy during the course of rotation. One resulting sonified area is illustrated and is designated 96. At a slight angle behind it and in a position to proceed over the sonified area 96 during the course of rotation is a set of receiver strips 98 with the total area of the set being less than the sonified area 96. For each acoustic transmission the set of receiver strips receives reflected target information. As seen from previous positions such as 102 and 103, of the set of receiver strips, there is an overlap of information indicated by the shaded portion 105. This overlap may be taken care of in the same manner as was described with respect to FIG. 9. The information contained in the receiver strips may be recorded and/or displayed in any one of a number of ways such as a cathode ray tube (CRT) or a CRT in conjunction with photographic film. FIG. 14 illustrates electromechanical apparatus which may be utilized for displaying signals received from the linear mode of operation illustrated in FIG. 9.

FIG. 14, an electro-sensitive paper strip 110 is moved at a constant velocity in the direction of the arrow by suitable apparatus (not shown). A portion of the paper 110 is broken away to illustrate below it an insulating base 112 having disposed on the surface thereof a plurality of electrical conductors in the form of wires 114. In the present example, 10 receiver strips were formed and the information contained in each strip was provided by the sum and detector circuits B1 to B10 of FIG. 6. The outputs of these circuits are connected to respective wires 114. Disposed directly over the paper 110 is an insulating block 117 having on the undersurface thereof a wire conductor 119 which is in contact with the upper surface of the electro-sensitive paper 110 and which is connected to a reference potential such as ground. The block, and therefore the wire conductor 119 is operably connected through rods 121 and cam follower 122 to a rotating cam 124, which during the course of its rotation in the direction of the arrow causes the wire conductor 119 to traverse the paper 110 and then return to its original position under the action of springs 126. The shape of the cam 124 and its speed of rotation are chosen such that the wire conductor 119 moves over the set of wires 114 (with the electro-sensitive paper 110 sandwiched therebetween) at a rate proportional, or corresponding to the rate at which the bottom information from the area is received. For example, with the apparatus of FIG. 14, just as the wire conductor 119 proceeds to move, the sum and detector circuits of FIG. 6 are providing output signals representative of target information at $R_{MIN}$ and by the time the wire conductor 119 is at the end of its transverse travel, the situation pictured in FIG. 14, the sum and detector circuits are providing output signals to the plurality of wires 114, representative of target information at $R_{MAX}$. As the wire conductor proceeds in its travel, the potential difference between it and the signals in the plurality of wires 114 causes the electro-sensitive paper to discolor in proportion to the current. After the wire conductor 119 reaches the limit of its travel, further rotation of the cam 124 brings it back to its initial position. During this return period, a subsequent acoustic transmission is taking place and the operation is repeated. For an accurate presentation of the target area, the electro-sensitive paper 110 may be moved at a velocity which is proportional to the velocity of the apparatus as it proceeds over the target area.

For some ocean conditions, the apparatus may be at an angle relative to the direction of travel, such angle being known as the yaw angle. To correct for yaw angle in the display means are provided for selectively orienting the wires 114 relative to the movement of the electro-sensitive paper 110. This is accomplished by the base 112 being rotatable about pivot 129 to correspond to the yaw angle.

Figure 15:
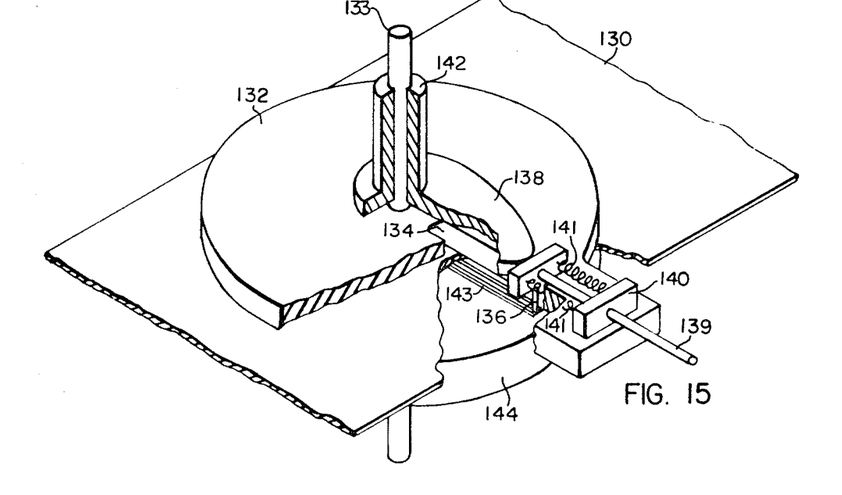
FIG. 15 illustrates a display means for the rotational mode operation.

For displaying target signals from the receiver strips in the rotational mode of operation as in FIG. 13, the apparatus, shown in simplified form with portions broken away, in FIG. 15, may be utilized. As was the case with respect to FIG. 14, there is employed electro-sensitive paper 130 which is held in position until one complete revolution of disc 132 is made by rotation means (not shown) connected to shaft 133. The disc 132 has a slot 134 therein for receiving a wire conductor at the lower portion of insulating block 136 guided by rod 139 moveable in block 140. Block 136 is biased by springs 141 to move within the slot 134 as cam 138 rotates by rotation means (not shown) connected to coaxial shaft 142. Disposed directly beneath the slot 134 and on the other side of electro-sensitive paper 130 is a set of wires 143, one for each receiver strip, and disposed on disk 144 rotatable in synchronism with the disc 132 so that as disc 132 rotates the set of wires 143 is always directly beneath the slot 134. The rotation of discs 132 and 144 is made proportional to the rotation of the apparatus at position 78 in FIG. 13 and the rotation of cam 138, and its shape, are such that the wire conductor in block 136 proceeds over the underlying wires 143 at a rate corresponding to the sonification rate to effect the writing and display of target information. After each complete rotation of the discs 132 and 144, and therefore a display of the area 80 in FIG. 13, the electro-sensitive paper 130 may be indexed to a position to allow a subsequent scan display.

Figure 16:
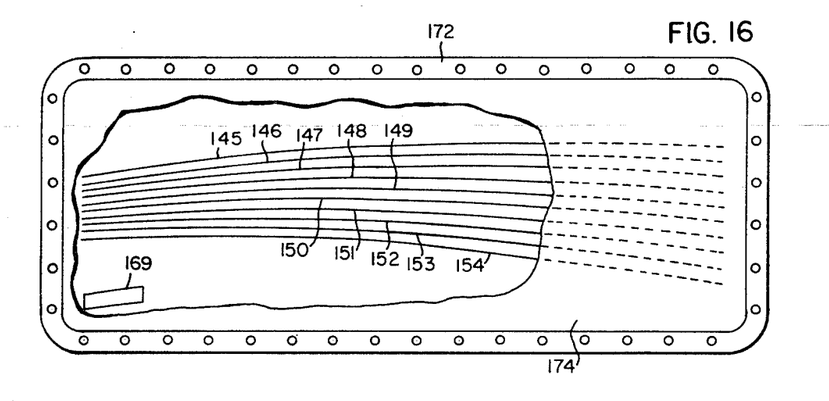
FIG. 16 illustrates an alternative arrangement for obtaining plural receive beams.
Figure 17:
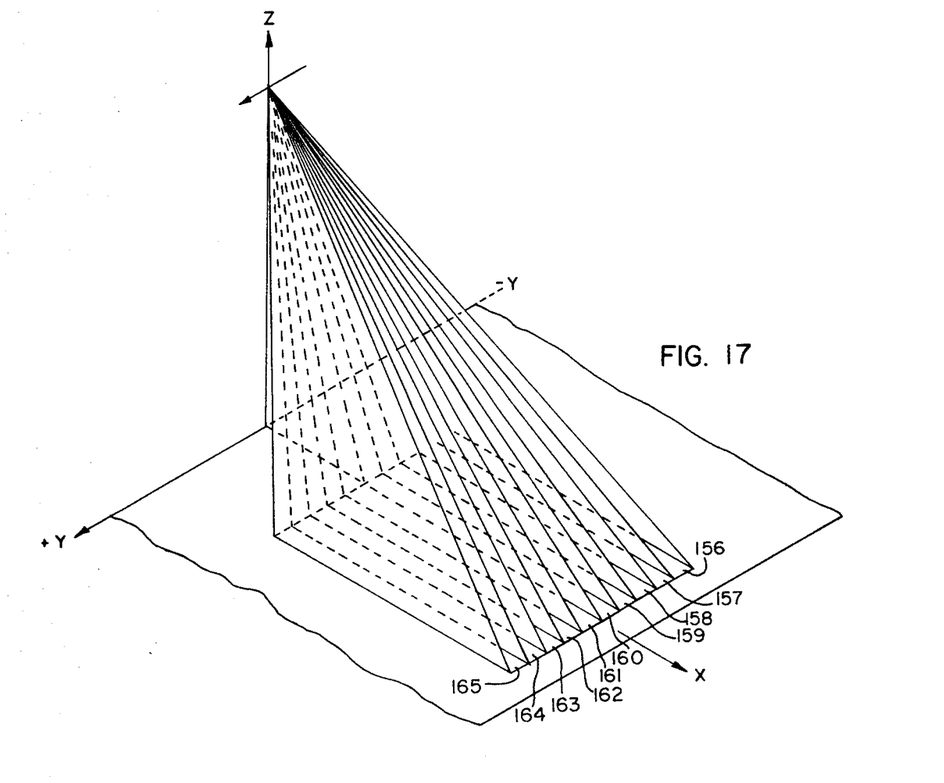
FIG. 17 illustrates the receiver strips of the apparatus of FIG. 16.

In FIG. 5, there was described transducer apparatus which included a receiver transducer 24 having a plurality of transducer elements 37 phased relative to one another to produce a plurality of receiver beams for receiving reflected acoustic energy from a plurality of adjacent receiver strips on the target area. In FIG. 16, there is illustrated transducer apparatus for performing the same function by the use of a plurality of receiver transducers 145 to 154 each one being oriented to receive reflected acoustic energy from a respective one of the receiver strips 156 to 165 of FIG. 17 and each operable at the same frequency. With each of the N receiving transducers having a length L, the transmitting transducer has a length equal to or less than $L/N$ so that the total area sonified is equal to or greater than the total area of the receiver strips 156 to 165. As was the case with respect to FIG. 5, the transducer apparatus illustrated in FIG. 16 is carried in a housing 172 having a rho-c rubber covering 174 with a portion broken away to view the transducers.

The individual receiver transducers 145 to 154 produce individual receiver strips which are slightly trapezoidal but which generally lie along respective lines which are parallel to one another as opposed to the radial arrangement of FIG. 7A.

The provision of individual receiver transducers also eliminates the need for delay lines as illustrated in FIG. 6 in that each transducer could be connected to a respective amplifier means the output of which may be fed directly to the display apparatus. Although the receiver transducers 145 to 154 are illustrated as solid lines, in an actual construction they could be fabricated of transducer elements lying along those lines. All elements lying along a line would be electrically connected to amplifier means for that particular transducer receiver.

Although the apparatus has been described with respect to the linear and rotating modes it is apparent that other types of operations are possible. For example, the apparatus could be mounted on the bow of a vessel for examining the terrain ahead of the vessel and over which the vessel will pass. The apparatus may examine other target areas at various other angles relative to the direction of travel and with a large number of beams, the apparatus may even be situated on a stationary platform or carrier. The term side looking therefore pertains to any such system characterized by getting information in one dimension on a time basis.

I claim:

1. Side looking sonar apparatus for use over a target area comprising:
   a. transmitter transducer means for projecting acoustic energy of a certain frequency and sonifying a portion of said target area;
   b. receiver means including receiver transducer means for forming multiple receiver beams, for receipt of said acoustic energy reflected from a minimum range out to a maximum range from multiple adjacent elongated receiver strips on said target area to provide corresponding output signals indicative thereof;
   c. the total area of said portion sonified in one acoustic projection being at least equal to the total area of all said receiver strips from said minimum range out to said maximum range; and
   d. display means responsive to said output signals for displaying as a function of time, an indication of said received acoustic energy from each said receiver strip.

2. Apparatus according to claim 1 wherein:
   a. said receiver transducer means is of a length L and
   b. said transmitter transducer means is of a length $\leq 24L/N$ is the number of said receiver strips.

3. Apparatus according to claim 1 wherein:
   a. said receiver transducer means is of a width W; and
   b. said transmitter transducer means is of a width greater than W.

4. Apparatus according to claim 1 wherein:
a. said multiple adjacent elongated receiver strips include curved receiver strips and touching receiver strips.

5. Apparatus according to claim 1 wherein:
a. said receiver transducer means comprises a single receiver transducer.

6. Apparatus according to claim 1 wherein:
a. said receiver transducer means comprises a plurality of receiver transducers, one for each said receiver beam and all operable at the same frequency.

7. Apparatus according to claim 1 which includes:
a. a carrier;
b. a housing connected to said carrier for containing said transducer means;
c. said housing being rotatable relative to said carrier.

8. Apparatus according to claim 7 wherein:
a. said housing is rotatable through 360°.

9. Apparatus according to claim 1 wherein:
a. said display means includes
   i. an electro-sensitive recording medium;
   ii. a plurality of electrical conductors connected to receive a respective one of said output signals;
   iii. a moveable conductor for connection to a reference potential;
b. said recording medium being in contact with, and sandwiched between, said plurality of electrical conductors and said moveable conductor;
c. said display means additionally including
   i. means for repetitively moving said moveable conductor over said plurality of conductors.

10. Apparatus according to claim 9 wherein:
a. said recording medium relatively moves past said conductors; and which additionally includes
b. means for selectively orienting said plurality of conductors relative to said movement of said recording medium.

11. Apparatus according to claim 7 wherein:
a. said display means includes
   i. an electro-sensitive recording medium;
   ii. a plurality of electrical conductors connected to receive a respective one of said output signals;
   iii. a movable conductor for connection to a reference potential;
b. said recording medium being in contact with, and sandwiched between, said plurality of electrical conductors and said movable conductor;
c. said display means additionally including
   i. means for repetitively moving said movable conductor over said plurality of conductors; and
   ii. means for rotating said plurality of conductors relative to said recording medium through an angle corresponding to the rotation of said housing relative to said carrier.

12. Side looking sonar apparatus for use over a target area comprising:
a. transmitter means for projecting acoustic energy and sonifying a portion of said target area;
b. receiver means operable to provide a plurality of receiver beams for receiving reflected acoustic energy from a plurality of adjacent receiver strips on said target area;
c. said receiver strips extending generally radially from a reference position.

* * * * *